US011235956B2

(12) United States Patent
Petersen et al.

(10) Patent No.: US 11,235,956 B2
(45) Date of Patent: Feb. 1, 2022

(54) METHOD AND SYSTEM FOR LIFTING A WIND TURBINE ROTOR

(71) Applicant: Vestas Wind Systems A/S, Aarhus N. (DK)

(72) Inventors: Henrik Petersen, Horens (DK); Jesper Hermann Hansen, Varde (DK); Jens Torborg, Årre (DK)

(73) Assignee: Vestas Wind Systems A/S, Aarhus N. (DK)

( * ) Notice: Subject to any disclaimer, the term of this patent is extended or adjusted under 35 U.S.C. 154(b) by 467 days.

(21) Appl. No.: 16/473,374

(22) PCT Filed: Dec. 13, 2017

(86) PCT No.: PCT/DK2017/050427
§ 371 (c)(1),
(2) Date: Jun. 25, 2019

(87) PCT Pub. No.: WO2018/121822
PCT Pub. Date: Jul. 5, 2018

(65) Prior Publication Data
US 2020/0140236 A1 May 7, 2020

(30) Foreign Application Priority Data
Dec. 28, 2016 (DK) .......................... PA 2016 71054

(51) Int. Cl.
*B66C 1/10* (2006.01)
*B66C 1/12* (2006.01)
*F03D 13/10* (2016.01)

(52) U.S. Cl.
CPC ............... *B66C 1/108* (2013.01); *B66C 1/12* (2013.01); *F03D 13/10* (2016.05); *F05B 2230/61* (2013.01)

(58) Field of Classification Search
CPC ........... B66C 1/108; B66C 1/107; B66C 1/12; B66C 1/62; F03D 13/10; F03D 80/50; F05B 2230/608; F05B 2230/61
See application file for complete search history.

(56) References Cited

U.S. PATENT DOCUMENTS

2008/0216301 A1* 9/2008 Hansen .................. B66C 23/36
29/428
2010/0043227 A1 2/2010 Numajiri
(Continued)

FOREIGN PATENT DOCUMENTS

CN 200978179 Y 11/2007
CN 101631954 A 1/2010
(Continued)

OTHER PUBLICATIONS

China National Intellectual Property Administration, First Notification of Office Action in CN Application No. 201780084498.6, dated Apr. 9, 2020.
(Continued)

*Primary Examiner* — Emmanuel M Marcelo
(74) *Attorney, Agent, or Firm* — Wood Herron & Evans LLP

(57) ABSTRACT

A method of lifting a rotor of a wind turbine, the rotor having a center of gravity and including a hub and first, second, and third blades projecting outwardly from the hub at locations circumferentially distributed thereabout, includes positioning first and second slings around the first and second blades, respectively, to define first and second lifting zones delineating a lifting envelope, wherein the lifting envelope encompasses the center of gravity. The method also includes lifting the rotor above a surface via the first and second slings wherein the rotor is in one of a substantially horizontal or substantially vertical orientation, with the aid of at least (Continued)

one of the first and second slings while continuing to fully support the rotor by the first and second slings.

16 Claims, 9 Drawing Sheets

(56) References Cited

U.S. PATENT DOCUMENTS

| | | | |
|---|---|---|---|
| 2013/0045110 A1 | 2/2013 | Wagner | |
| 2013/0236324 A1* | 9/2013 | Bech | B66C 1/108 |
| | | | 416/233 |
| 2014/0319091 A1 | 10/2014 | Trede et al. | |
| 2015/0028610 A1* | 1/2015 | Hansen | F03D 13/40 |
| | | | 294/81.55 |
| 2015/0232307 A1* | 8/2015 | Holloway | F03D 80/50 |
| | | | 414/800 |
| 2017/0045029 A1* | 2/2017 | Senthoorpandian | F03D 80/50 |
| 2018/0044141 A1* | 2/2018 | Hansen | B66C 1/34 |
| 2019/0203700 A1* | 7/2019 | Numajiri | B66C 23/185 |

FOREIGN PATENT DOCUMENTS

| | | |
|---|---|---|
| CN | 202848861 U | 4/2013 |
| DE | 102009005632 A1 | 7/2010 |
| DE | 202010904093 U1 | 5/2011 |
| GB | 2439133 A | 12/2007 |
| WO | 2008089763 A2 | 7/2008 |
| WO | 2017108052 A1 | 6/2017 |

OTHER PUBLICATIONS

European Patent Office, International Search Report and Written Opinion in PCT Application No. PCT/DK2017/050427, dated Mar. 27, 2018.

Danish Patent and Trademark Office, Search and Examination Report in PA 2016 71054, dated Jun. 16, 2017.

European Patent Office, Examination Report in EP Application No. 17816426.5, dated Jun. 10, 2020.

* cited by examiner

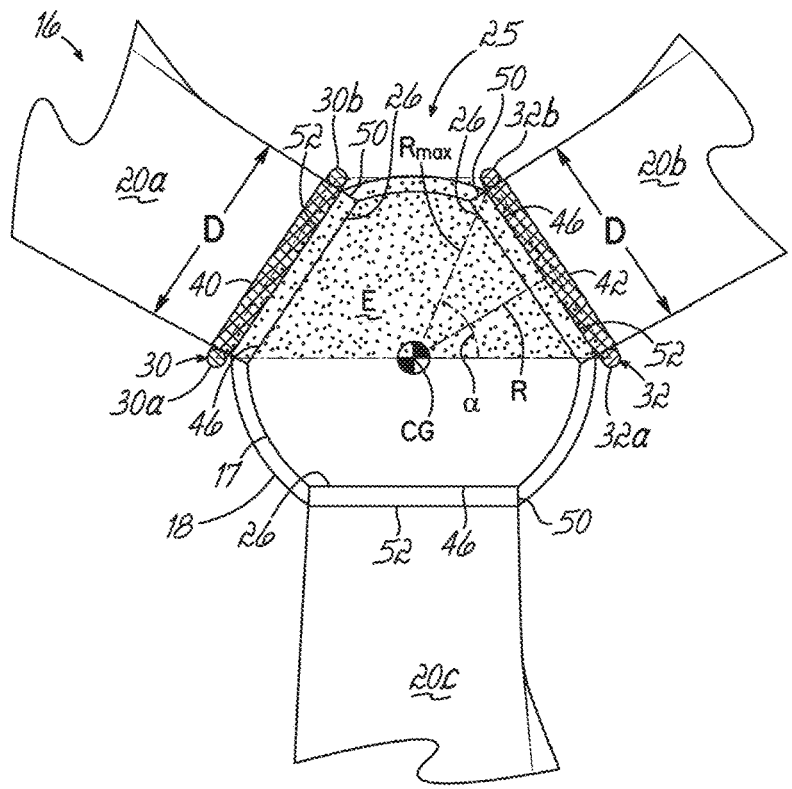
FIG. 2
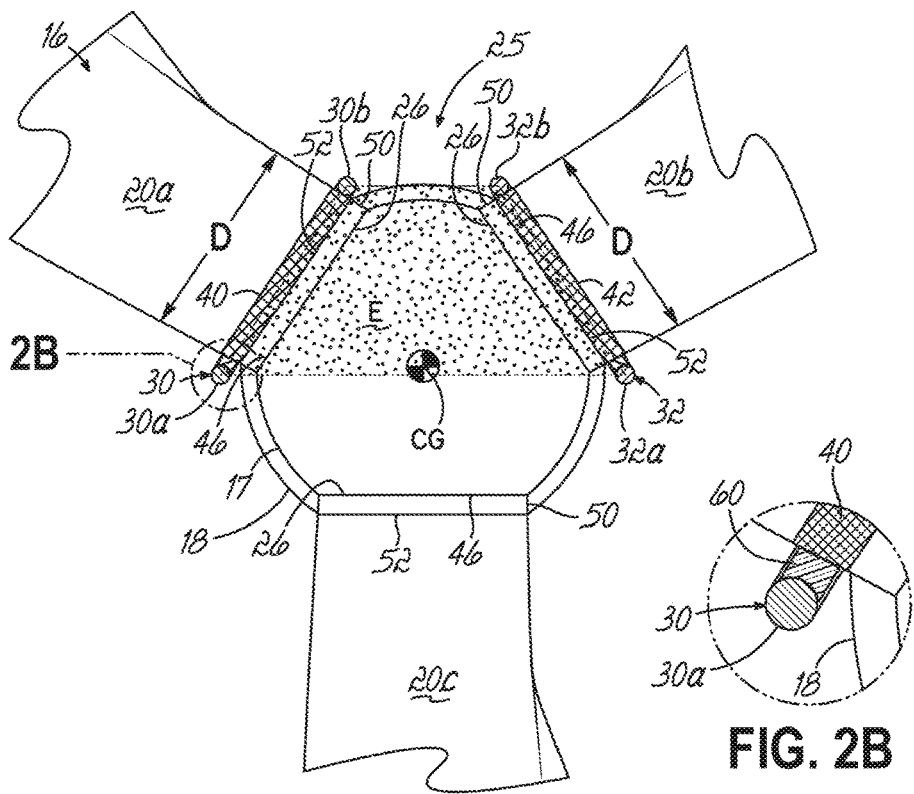
FIG. 2A
FIG. 2B

METHOD AND SYSTEM FOR LIFTING A WIND TURBINE ROTOR

TECHNICAL FIELD

This invention generally relates to wind turbines, and more particularly to an improved lifting system and method for performing a full rotor lift.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a plurality of blades extending from a hub and supported in the nacelle by means of a shaft. The shaft couples the rotor either directly or indirectly with a generator, which is housed inside the nacelle. Consequently, as wind forces the blades to rotate, electrical energy is produced by the generator.

Blades may be attached to a wind turbine in a variety of ways. One such way is to first mount a rotor hub to the nacelle, and then to attach blades one by one to the installed hub. In other words, the rotor may be assembled on the nacelle by first installing the hub to the nacelle and subsequently hoisting each individual blade, such as by a crane, toward the nacelle and attaching each blade to the hub. However, this process is expensive and time-consuming, as it requires separately hoisting the hub and each individual blade, and requires personnel to couple each blade to the hub above ground level.

Another way, commonly referred to as a "full rotor lift," involves preassembling the blades and hub at ground level and subsequently lifting the whole rotor as a single unit and mounting it to the nacelle. In this method, the rotor is typically lifted from a horizontal orientation (e.g., flat on the ground), and is turned while suspended into a generally vertical orientation for nacelle attachment. The initial rotor lift from the horizontal orientation is usually performed using a primary crane, which grips the rotor at a dedicated lifting point on the hub. The lifting point may be provided via a hub yoke, for example, which may be positioned on a flank of the hub between two adjacent blades. Examples of such yokes are disclosed by WO2008089763 and U.S. Patent Publication No. 2014/0319091. When the rotor is suspended in this manner by the primary crane, the blade which extends in the opposite direction from the lifting point may extend downward toward the ground. Thus, the downward pointing blade must usually be supported off the ground by a secondary crane to prevent the blade from impacting the ground. The rotor may then be turned into a generally vertical orientation by the combined, coordinated action of the primary and secondary cranes. This process may be reversed in order to remove the rotor from the wind turbine, such as for maintenance or replacement purposes.

As such, a conventional full rotor lift process is undesirably complicated. For example, the need for multiple cranes to install a single rotor is undesirable. Likewise, the need for a dedicated interface between the rotor and the primary crane, such as a hub yoke, is undesirable. Moreover, the concerted actions of the primary and secondary cranes may be difficult to properly execute in order to suitably install the rotor.

Manufacturers of wind turbines and wind turbine components continually strive to improve systems and methods associated with the assembly of wind turbines. It would therefore be desirable to provide an improved full rotor lift system and method for a wind turbine.

SUMMARY

In one embodiment, a method of lifting a rotor of a wind turbine, the rotor having a center of gravity and including a hub and first, second, and third blades projecting outwardly from the hub at locations circumferentially distributed thereabout, includes positioning first and second slings around the first and second blades, respectively, to define first and second lifting zones delineating a lifting envelope, wherein the lifting envelope encompasses the center of gravity. The method also includes lifting the rotor above a surface via the first and second slings wherein the rotor is in one of a substantially horizontal or substantially vertical orientation, with the aid of at least one of the first and second slings while continuing to fully support the rotor by the first and second slings. Reorienting the rotor may include activating at least one sling actuator. For example, activating the at least one sling actuator may adjust a length of at least one of the first and second slings, or may apply a friction drive to at least one of the first and second slings. In one embodiment, the at least one sling actuator includes at least one of a hydraulic actuator, a jack, a winch, or a friction drive.

In one embodiment, reorienting the rotor includes adjusting a pitch of at least one of the first and second blades. For example, reorienting the rotor may include activating at least one pitching system of the rotor to adjust the pitch of at least one of the first and second blades. In one embodiment, activating the at least one pitching system of the rotor causes the first blade to rotate in a clockwise direction while causing the second blade to rotate in a counterclockwise direction.

In one embodiment, the method further includes positioning at least one wedge between at least one of the first and second blades and the respective sling to expand the lifting envelope.

In another embodiment, a full rotor lift system for lifting a rotor of a wind turbine, the rotor having a center of gravity and including a hub and first, second, and third blades projecting outwardly from the hub at locations circumferentially distributed thereabout in equal intervals, includes first and second slings for attaching to the first and second blades, respectively, to define first and second lifting zones delineating a lifting envelope. The lifting envelope includes the center of gravity such that the first and second slings are capable of fully supporting the rotor above a surface in a horizontal orientation. The system further includes at least one actuator for reorienting the rotor between a horizontal and a vertical orientation with the aid of at least one of the first and second slings. The at least one actuator may include at least one sling actuator. For example, the at least one sling actuator may be operable to adjust a length of at least one of the first and second slings. In one embodiment, the at least one sling actuator includes at least one of a hydraulic actuator, a jack, a winch, or a friction drive.

In one embodiment, the at least one actuator includes at least one pitching system of the rotor. For example, the at least one pitching system may be operable to rotate the first blade in a clockwise direction while rotating the second blade in a counterclockwise direction.

In one embodiment, the system further includes at least one wedge operable to expand the lifting envelope when positioned between at least one of the first and second blades and the respective sling.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIG. 2 is a schematic top view of a rotor including a lifting arrangement according to an aspect of the invention.

FIG. 2A is a schematic top view of a rotor including an alternative lifting arrangement according to an aspect of the invention.

FIG. 2B is a magnified view of area 2B in FIG. 2A.

DETAILED DESCRIPTION

Figure 1:
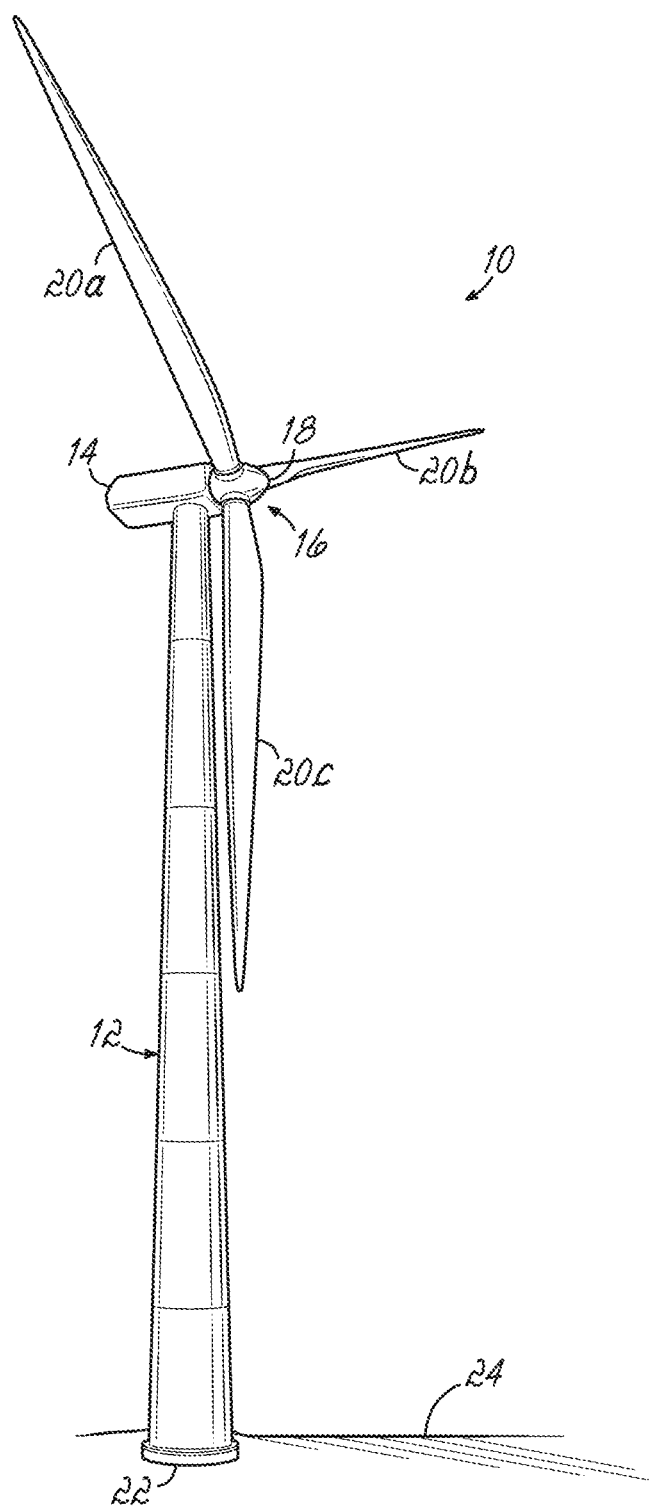
FIG. 1 is a perspective view of a wind turbine assembled according to an aspect of the invention.

With reference to FIG. 1, a wind turbine 10 includes a tower 12, a nacelle 14 disposed at the apex of the tower 12, and a rotor 16 operatively coupled to a generator (not shown) housed inside the nacelle 14. In addition to the generator, the nacelle 14 houses miscellaneous components required for converting wind energy into electrical energy and various components needed to operate, control, and optimize the performance of the wind turbine 10. The tower 12 supports the load presented by the nacelle 14, the rotor 16, and other components of the wind turbine 10 that are housed inside the nacelle 14 and also operates to elevate the nacelle 14 and rotor 16 to a height above ground level or sea level, as may be the case, at which faster moving air currents of lower turbulence are typically found.

The rotor 16 of the wind turbine 10, which is represented as a horizontal-axis wind turbine, serves as the prime mover for the electromechanical system. Wind exceeding a minimum level will activate the rotor 16 and cause rotation in a plane substantially perpendicular to the wind direction. The rotor 16 of the wind turbine 10 includes a central rotor hub 17 (FIG. 2) covered by a cowling or spinner 18 and a plurality of blades 20a, 20b, 20c that project outwardly from the central hub 17 at locations circumferentially distributed thereabout in equal intervals. In the representative embodiment, the rotor 16 includes first, second, and third blades 20a, 20b, 20c, but the number may vary. The blades 20a, 20b, 20c are configured to interact with the passing air flow to produce lift that causes the rotor hub 17 to spin about a longitudinal axis defined thereby. As shown, the tower 12 includes a foundation or base 22 for supporting the wind turbine 10 on a surface, such as a platform or the ground 24.

The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator to the power grid as known to a person having ordinary skill in the art As is well known in the industry, for certain wind turbine designs, the rotor blades 20a, 20b, 20c are coupled to the rotor hub 17 in a manner that allows the blades 20a, 20b, 20c to rotate or pitch about a longitudinal axis of the respective blades 20a, 20b, 20c. This is achieved by coupling the root end 26 (FIG. 2) of a blade 20a, 20b, 20c to a pitch bearing (not shown) operatively coupled to the rotor hub 17. The pitch bearing generally includes a ring rotatable relative to the hub 17 to which the root end 26 of the blade 20a, 20b, 20c is coupled. Pitch bearings are generally well known in the art and thus will not be described in further detail herein.

In accordance with an aspect of the invention, the rotor 16 may be raised to a position proximate the nacelle 14 for mounting thereto via a full rotor lift process. As set forth in further detail below, the rotor 16 may be lifted via a crane in a substantially horizontal orientation by attaching first and second lifting slings 30, 32 around first and second lifting zones 40, 42 on the first and second rotor blades 20a, 20b, respectively, and may be subsequently oriented into a substantially vertical orientation by manipulating one or more of the first and second lifting slings 30, 32. The rotor 16 may then be coupled to the nacelle 14 in a known manner. Thus, a full rotor lift may be achieved without a need for more than a single crane and/or without a need for a dedicated support system for the third blade 20c, resulting in an easy, expedited assembly of the wind turbine 10. Such a lift may also be achieved without a dedicated interface, such as a lifting yoke, between the slings 30, 32 and the rotor 16. More in particular, the lifting and rotation of a rotor 16 may be accomplished by grasping only two out of the three blades 20a, 20b, 20c of the rotor 16 and by suspending the rotor 16 while supported at only two of its three blades 20a, 20b, 20c. The rotor 16 may be lowered from the nacelle 14, such as for maintenance or replacement, in a reverse process. The features of the improved full rotor lift system and method are set forth in further detail below to clarify each of these functional advantages and other benefits provided in this disclosure.

With reference now to FIG. 2, each of the blades 20a, 20b, 20c is rigidly attached to the rotor hub 17 via respective hub flanges 46 prior to coupling the rotor 16 to the nacelle 14. As shown, a nonstructural interface between the spinner 18 and each blade 20a, 20b, 20c may be provided in the form of a sleeve 50 circumferentially surrounding a portion of each respective blade 20a, 20b, 20c near the root end 26 and terminating at a collar 52 outboard of the root end 26. In an alternative embodiment, the spinner 18 may be eliminated. In any event, the assembled rotor 16 includes a center of gravity CG, around which any resultant torque due to gravity is eliminated. One of ordinary skill in the art will understand how to determine the center of gravity of the rotor 16, and thus no further discussion of that process is described herein.

Figure 3A:
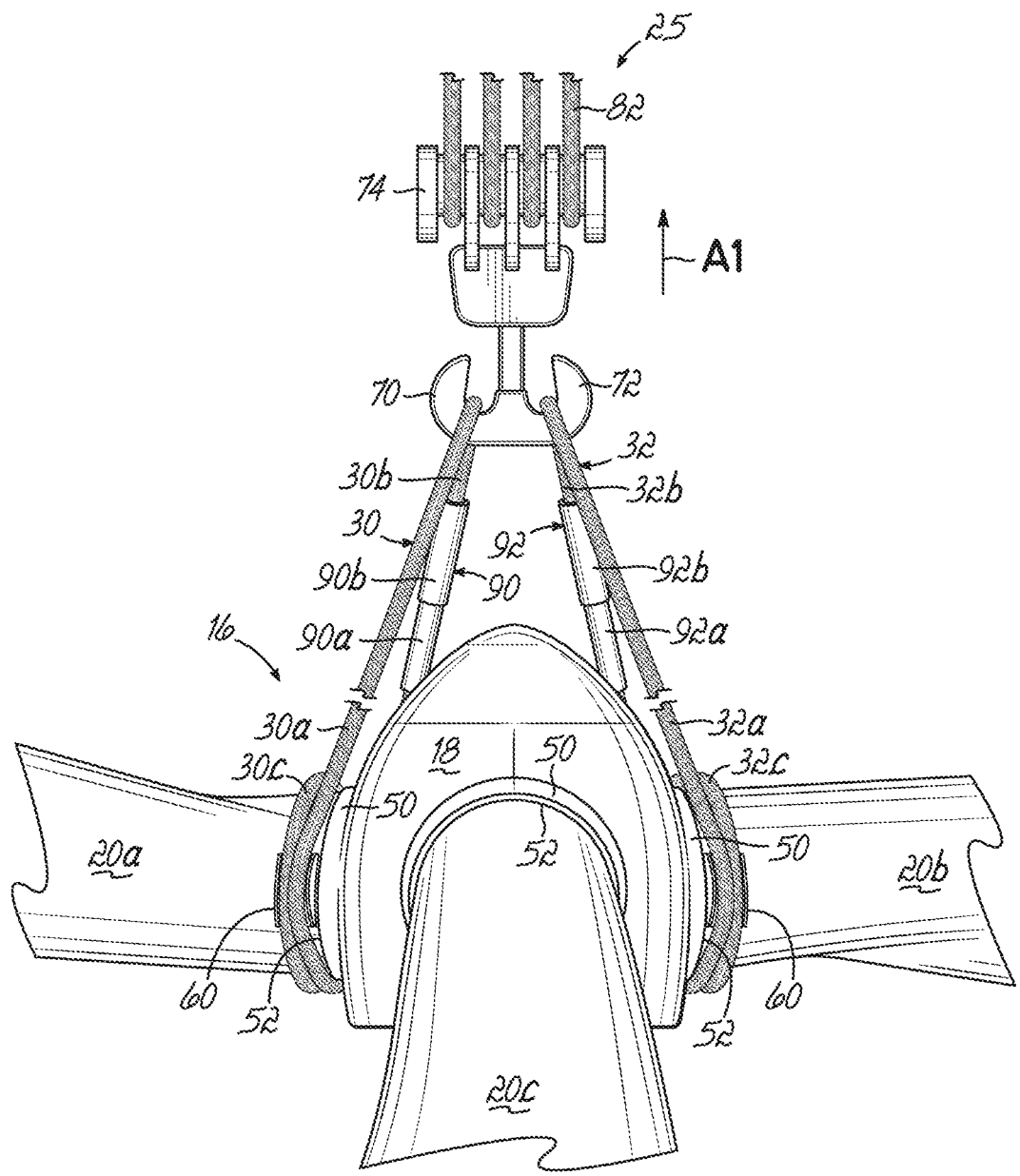
FIG. 3A is a perspective view of the rotor of FIG. 2A illustrating a lifting of the rotor according to an aspect of the invention.

With the rotor 16 assembled, a full rotor lift system 25 may be introduced. To that end, first and second lifting slings 30, 32 may be wrapped around the first and second blades 20a, 20b, respectively. As shown, the slings 30, 32 may be positioned at or near the interfaces between the hub 17 and the respective blades 20a, 20b. For example, the slings 30, 32 may be positioned adjacent the respective collars 50 at or near the interfaces between the spinner 18 and the respective blades 20a, 20b. Each sling 30, 32 includes forward and rearward strands 30a, 32a, 30b, 32b extending above the respective blade 20a, 20b on generally opposite lateral sides thereof, and a central strand 30c, 32c (FIG. 3A) disposed between the forward and rearward strands 30a, 32a, 30b, 32b and wrapped around the respective blade 20a, 20b at least once. For example, each central strand 30c, 32c may be wrapped around the respective blade 20a, 20b one and a half times. As shown, the first and second slings 30, 32 define first and second lifting zones 40, 42 on the blades 20a, 20b, respectively. In particular, the first and second lifting zones 40, 42 extend between the locations on the rotor 16 at which the forward and rearward strands 30a, 32a, 30b, 32b act, from a top view of the rotor 16. A sling 30, 32 may be provided as a continuous loop, suspended along its length directly or indirectly from a lifting element such as a hook 70, 72 (FIG. 3A). Alternatively, a sling 30, 32 may be provided with first and second ends, and preferably secured to a lifting element such as a hook 70, 72 by both ends or by at least one end thereof, for example.

Together, the first and second lifting zones 40, 42 delineate a lifting envelope E which encompasses the center of gravity CG of the rotor 16. In other words, the points at which the forward and rearward strands 30a, 32a, 30b, 32b act upon the respective blades 20a, 20b encompass the center of gravity CG. This may be accomplished by positioning the rearward strands 30b, 32b on a rearward side of the center of gravity CG and the forward strands 30a, 32a on a forward side of the center of gravity CG. In the embodiment shown, this involves positioning at least the forward strands 30a, 32a at or in close proximity to the interface between the spinner 18 and the respective blade 20a, 20b. It will be appreciated that if one were to hypothetically reposition the forward strands 30a, 32a further up the blades shown in a direction away from the root ends 26, at some point the lifting envelope E would no longer encompass the center of gravity CG. That is to say, the lifting envelope E would shift away from the center of gravity CG, leaving the center of gravity CG outside the lifting envelope E. In this regard, it may be beneficial to arrange the forward and rearward strands 30a, 32a, 30b, 32b near the spinner 18 and/or collar 52, such that the lifting zones 40, 42 each subtend an angle α at the center of gravity CG of at least 60 degrees. This may occur, for example, when the forward strands 30a, 32a are positioned as shown and the root diameter D of each blade 20a, 20b at each lifting zone 40, 42 is equal to or greater than the furthest radial distance $R_{max}$ of each lifting zone 40, 42 from the center of gravity CG. In addition or alternatively, this may occur when each lifting zone 40, 42 is located at a blade radius R from the center of gravity CG and each root diameter D at the respective lifting zone 40, 42 satisfies D≥R×tan(60)/2. Thus, if the root diameters D were to be substantially increased from those shown while maintaining the blade radius R, the lifting slings 40, 42 may potentially be positioned further away from the respective root ends 26 while still capturing the center of gravity CG in the lifting envelope E.

As shown in FIGS. 2A and 2B, the system 25 may further include one or more interface blocks or wedges 60 inserted between the lifting slings 30, 32 and the respective blades 20a, 20b in order to shift a forward boundary of the envelope E further outward of, or beyond, the forward side of the center of gravity CG. In this manner, the wedges 60 may extend the lifting zones 40, 42 in a forward direction and thereby expand the lifting envelope E to more fully capture the center of gravity CG. Thus, the wedges 60 may provide improved lifting and/or control of the rotor 16, as discussed below. In the embodiment shown, the center of gravity CG may be adequately captured by the lifting envelope E even without the wedges 60 as previously described with respect to FIG. 2. For certain rotor designs, such as, for example, if the root diameters D were to be substantially decreased from those shown while maintaining the blade radius R, the wedges 60 may allow the lifting envelope E to include the center gravity while the lifting slings 30, 32 alone might otherwise fail to do so. Thus, the wedges 60 may allow a full rotor lift to be performed as described herein on rotors for which such a lift might otherwise not be possible. It will be appreciated that each wedge 60 may be constructed of any material suitable for transferring at least a portion of the weight of the rotor 16 to the respective sling 30, 32. A resilient material with a low degree of compressibility may be preferred, such as a compliant plastics material or vulcanized rubber, for example.

Figure 5A:
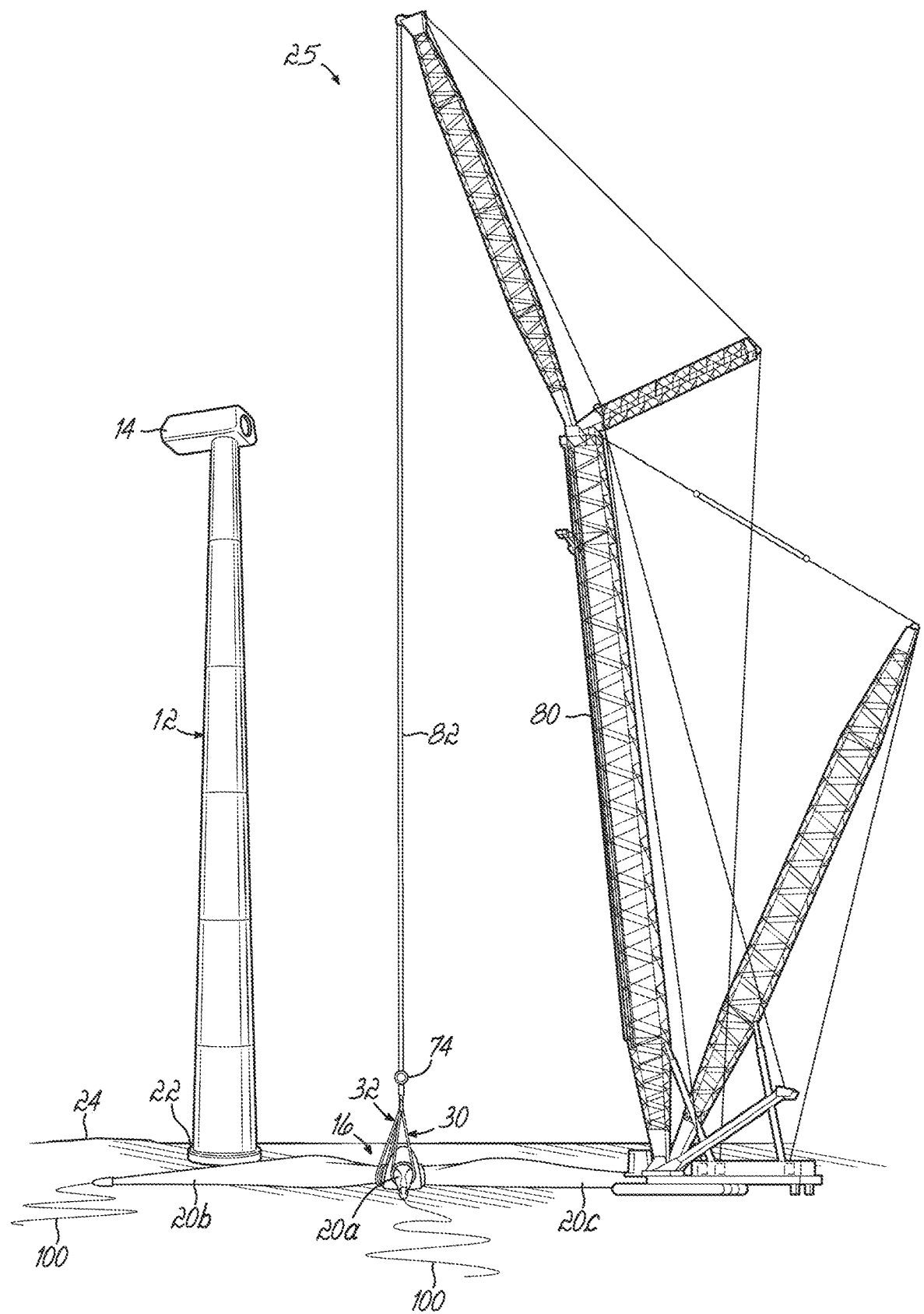
FIGS. 5A-5D illustrate a method of performing a full rotor lift according to an aspect of the invention.

With the slings 30, 32 positioned around the blades 20a, 20b to encompass the center of gravity CG, the rotor 16 may be lifted via the forward, central, and rearward strands 30a, 30b, 30c, 32a, 32b, 32c without any resultant torque acting on the rotor 16 due to gravity forces, as shown in FIG. 3A. For example, the slings 30, 32 may be suspended from first and second hooks 70, 72 coupled to a lower sheave 74 of a crane 80 (FIG. 5A). In aspects, and in the embodiment shown, each sling 30, 32 may be continuous and may be supported over a respective part of a lifting hook 70, 72. Each sling 30, 32 may in particular be in frictional contact with the lifting hook 70, 72. Alternatively, each sling 30, 32 may have two ends, each of which may terminate at a lifting hook 70, 72. In either arrangement, and in particular, relative movement between a lifting sling 30, 32 and the hook 70, 72 may be inhibited or prevented. A hoist rope 82 wrapped around the lower sheave 74 may be retracted to exert an upward force on the hooks 70, 72, and thereby lift the rotor 16 in the direction of arrow A1. Due to the center of gravity CG being encompassed within the lifting envelope E, the rotor 16 may remain in a substantially flat or horizontal orientation during the initial lifting. In aspects, a horizontal orientation of the rotor 16 may be ensured by providing the first and second slings 30, 32 of substantially equal length or by adjusting the effective lengths of either or both slings 30, 32, for example by means of a winch-type sling actuator 90, 92.

Figure 3B:
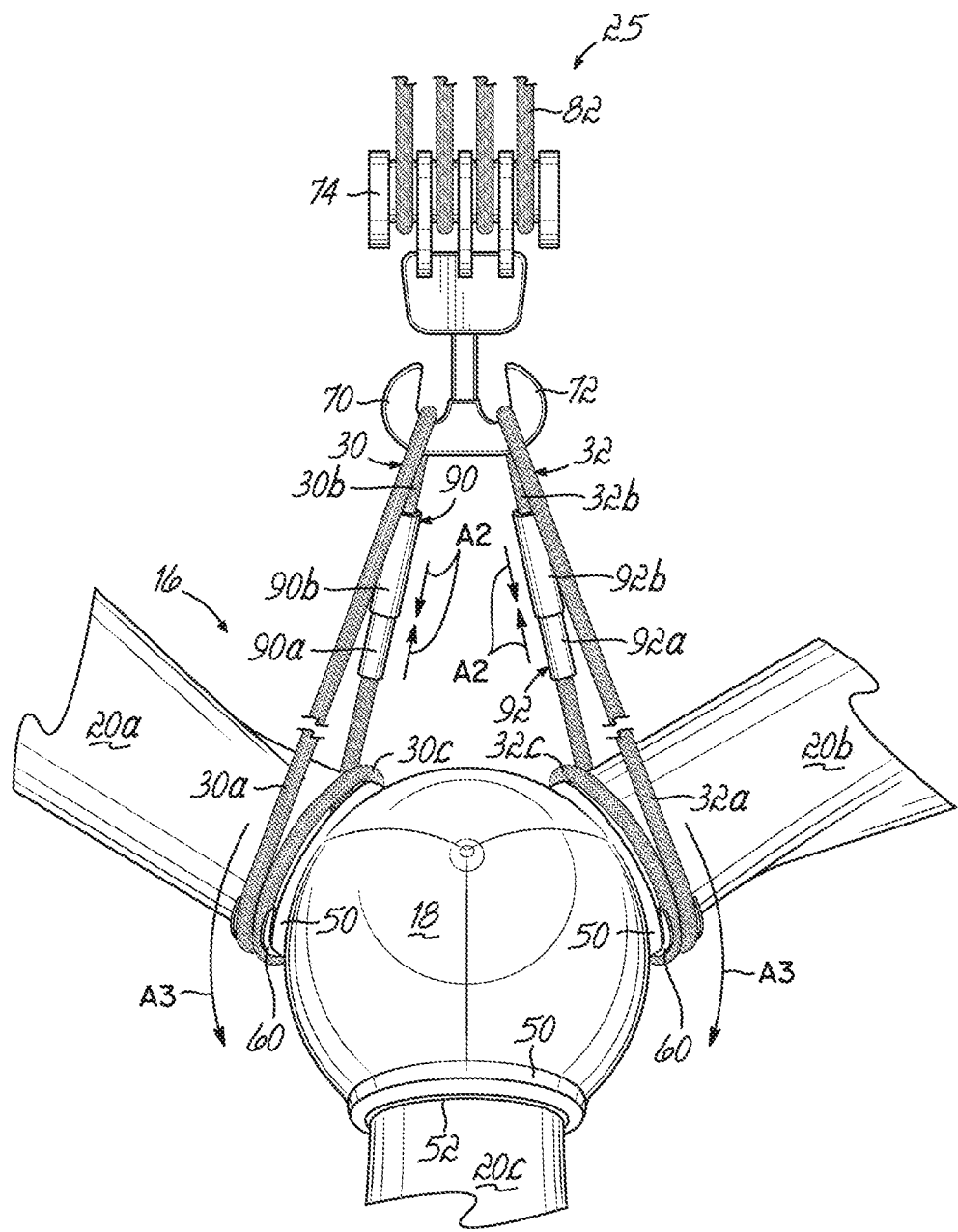
FIG. 3B is a perspective view similar to FIG. 3A illustrating a reorienting of the rotor according to an aspect of the invention.

Once the rotor 16 has been lifted to a desirable height, the rotor 16 may be reoriented toward a substantially vertical orientation. Preferably, the reorientation of the rotor 16 may be accomplished by applying a driving force to the rotor 16 with the aid of one or both lifting slings 30, 32. In aspects, a driving force may be applied to the rotor 16 by applying a linear force to one or both the slings 30, 32. In aspects, a driving force may be applied to the rotor 16 by means of a linear actuator 90, 92 associated with one or both slings 30, 32. In addition or alternatively, a driving force may be applied to a suspended rotor 16 by means of an actuator in the rotor hub 17. As shown in FIG. 3B, a driving force may be applied to the lifting slings 30, 32 by directly manipulating the lifting slings 30, 32. To that end, first and second sling actuators 90, 92 may be operatively coupled with the first and second slings 30, 32. In aspects, an actuator 90, 92 may for example be configured to draw in or let out a length of a sling 30, 32, to thereby adjust the effective length of the first and/or second slings 30, 32. For example, as shown, the sling actuators may be hydraulic actuators 90, 92 coupled to each rearward strand 30b, 32b. In this regard, each hydraulic actuator 90, 92 may include a piston 90a, 92a and a cylinder 90b, 92b interposed along the rearward strands 30b, 32b, respectively, such that the hydraulic actuators 90, 92 may contribute to the effective lengths of the rearward strands 30b, 32b. To that end, the pistons 90a, 92a may be configured to apply a driving force to the slings 30, 32 by at least partially retracting into the respective cylinders 90b, 92b, thereby also decreasing the effective lengths of the rearward strands 30b, 32b. In addition or alternatively, the pistons 90a, 92a may be configured to at least partially expand from the respective cylinders 90b, 92b, thereby increasing the effective lengths of the rearward strands 30b, 32b. As such, the hydraulic actuators 90, 92 may be activated to apply a rotating force to the rotor 16 by selectively adjusting the lengths of the slings 30, 32.

In aspects, and in the embodiment shown, each sling 30, 32 may be continuous and may be supported over a respective part of a lifting hook 70, 72. Each sling 30, 32 may in particular be in frictional contact with the lifting hook 70, 72. Alternatively, each sling 30, 32 may have two ends, each of which may terminate at a lifting hook 70, 72. When an actuator 90, 92 applies a drive force to a sling 30, 32, e.g. by acting on a rearward strand 30b, 32b thereof, this may result in a pulling action on the relevant strand 30b, 32b, and thereby in a pulling action at a rearward side of the rotor 16. In the case of hydraulic actuators 90, 92, as illustrated, a force may be applied to the slings 30, 32 by decreasing the length of a strand 30b, 32b between the hook 70, 72 and the lifting zone 40, 42 at or near a blade root 26. This may be achieved by retracting the pistons 90a, 92a into the respective cylinders 90b, 92b, as indicated by the arrows A2. The consequent drive force applied to the rearward strands 30b, 32b in conjunction with frictional forces between the slings 30, 32 and the blades 20a, 20b (and/or the wedges 60, if used) create a moment arm causing the rotor 16 to tilt away from its horizontal orientation, as indicated by the arrows A3. In particular, the rotor 16 may rotate about a point or axis lying within the lifting envelope E such that the first and second blades 20a, 20b are raised while the third blade 20c is lowered. Subsequently, and in a similar manner, if the lengths of the rearward strands 30b, 32b are increased by expanding the pistons 90a, 92a out of the respective cylinders 90b, 92b, then this would result in an opposite force being applied by the forward strands 30a, 32a, by virtue of the strand 30a, 32a being either frictionally blocked at or fastened at one end to a hook 70, 72. This may cause the rotor 16 to rotate such that the first and second blades 20a, 20b are lowered while the third blade 20c is raised (not shown). In one embodiment, the actuation of the first and second slings 30, 32 may be coordinated. For example, a force may be simultaneously applied to each sling 30, 32 by means of a set of actuators 90, 92. For example, the lengths of the rearward strands 30a, 32a may be decreased simultaneously and at similar speeds, or may be increased simultaneously and at similar speeds for a gradual and/or continuous reorienting of the rotor 16. Alternatively, the actuation of the first and second slings 30, 32 may be performed one at a time.

While hydraulic actuators 90, 92 are shown, any other suitable actuators may be used to manipulate the first and second slings 30, 32 such as, for example, a jack, a winch or any other actuator capable of applying a linear force to a sling 30, 32. In one example, a linear force may be applied to a sling 30, 32 by adjusting the effective lengths of the sling 30, 32. For example, a winch may reel in and/or wind out a rearward strand 30b, 32b to adjust an effective length thereof. Alternatively, slings 30, 32 may be configured as continuous loop slings, each frictionally wound over a suspended friction drive, such as, for example, a powered winding drum suspended from a hook 70, 72. A linear force may thereby be applied to a lifting sling 30, 32 by operating the powered winding drum, the effect of which will be to take in one strand 30a, 32a while paying out another strand 30b, 32b or vice versa, thereby applying a rotational force in a corresponding direction to the suspended rotor 16. In one embodiment, a remote control unit (not shown) may be used as a control interface for activating the actuators 90, 92 to apply a driving force in one direction or another to the slings 30, 32 and thereby adjust the orientation of the rotor 16. In addition or alternatively, an auxiliary power supply (not shown) for the actuators 90, 92 may be provided in the rotor 16 such as, for example, in the central hub 17.

Figure 4:
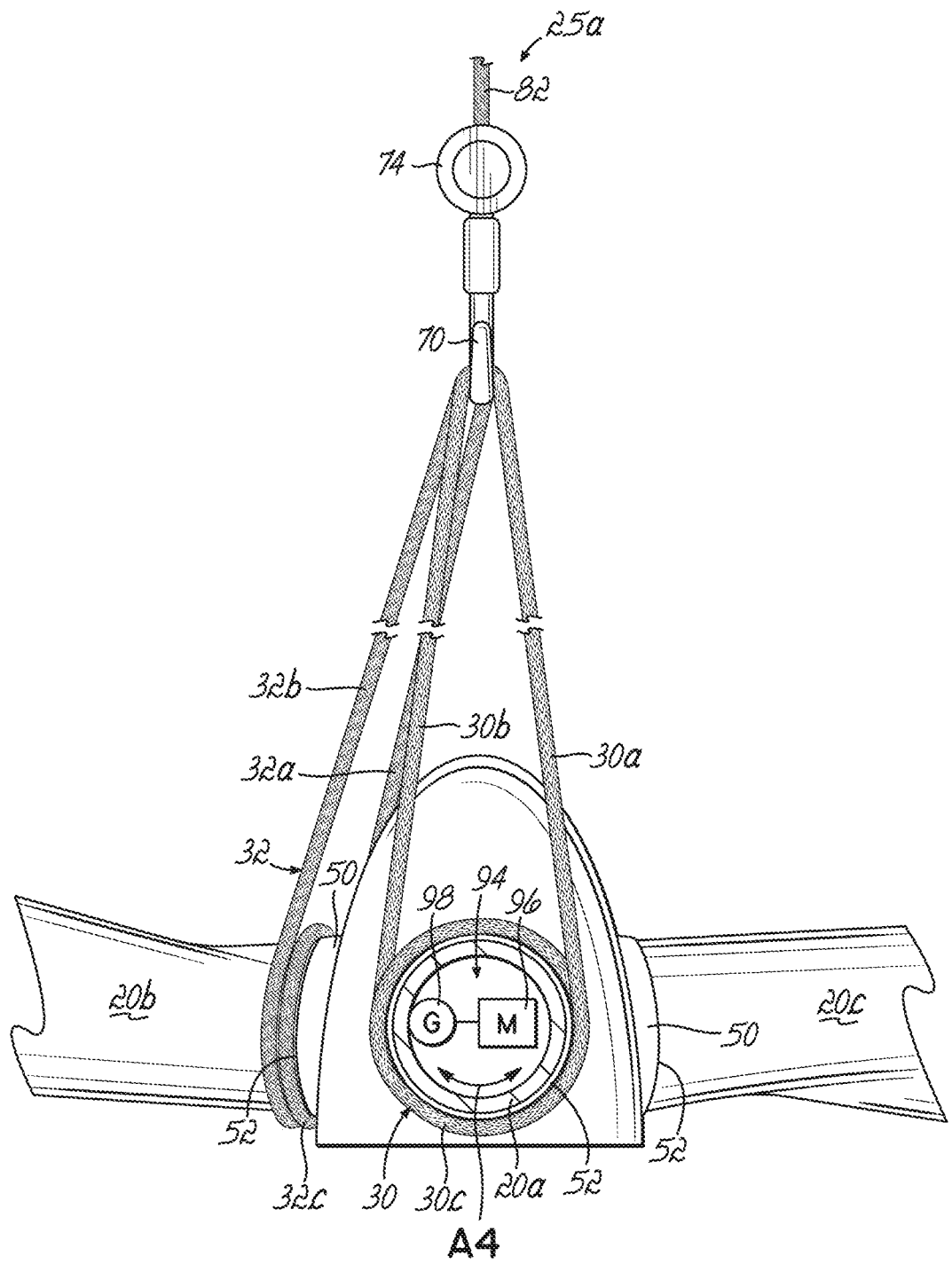
FIG. 4 is a side view of the rotor of FIG. 2 illustrating a reorienting of the rotor according to an aspect of the invention.

With reference now to FIG. 4, in an alternative embodiment of the system, designated as 25a, the direct sling actuators 90, 92 may be eliminated for certain rotor configurations. In particular, as previously discussed, for certain wind turbine designs, the rotor blades 20a, 20b, 20c are coupled to the rotor hub 17 in a manner that allows the blades 20a, 20b, 20c to rotate or pitch about a longitudinal axis of the respective blades 20a, 20b, 20c. Such wind turbines may be equipped with a powered, e.g. electrical or hydraulic, pitching system 94. The pitching system 94 may include an actuator such as, for example, at least one motor 96 which may be operatively coupled to at least one gear 98 for engaging inner aspects of the first and second blades 20a, 20b in order to effect a controlled pitching of the blades 20a, 20b in a clockwise or counterclockwise direction as indicated by the arrow A4. In one embodiment, an auxiliary power supply (not shown) for the motor 96 may be provided in the rotor 16 such as, for example, in the central hub 17. In any event, the slings 30, 32 may be attached at either end to a hook 70, 72 or frictionally engaged therewith, and wound around the respective blades 20a, 20b. The motor 96 may be activated to initiate a controlled pitching of the blades 20a, 20b. With the slings 30, 32 in frictional engagement with the hook 70, 72, or otherwise attached thereto, and in conjunction with frictional forces between the slings 30, 32 and the blades 20a, 20b (and/or the wedges 60, if used) the pitching of the blades 20a, 20b provides the drive necessary to cause the rotor 16 to tilt, even while the two suspended blades 20a, 20b of the rotor 16 may maintain a substantially constant chord angle in relation to the hook 70, 72 and/or slings 30, 32. For example, in the embodiment shown a clockwise pitching of the first blade 20a, with a simultaneous counterclockwise pitching of the second blade 20b may rotate the rotor 16 about a point or axis lying with the lifting envelope E such that the first and second blades 20a, 20b are raised while the third blade 20c is lowered. Subsequently, and in a similar manner, a counterclockwise pitching of the first blade 20a, with a simultaneous counterclockwise pitching of the second blade 20b may rotate the rotor 16 such that the first and second blades 20a, 20b are lowered while the third blade 20c is raised (not shown). In this way, the rotor's own pitching system 94 may in effect be operated as a powered hinge, albeit in a special pitching mode in which one suspended blade 20a is pitched in a direction opposite to the simultaneous pitching of the other suspended blade 20b. The rotor 16 is thereby reoriented, or tilted, by the effect of the blade-pitching drive pulling on one or other strand 30a, 32a, 30b, 32b of a sling 30, 32 in one or other direction. During rotor lifting, an auxiliary power source (not shown) may be provided in the hub 17 to enable to blade pitching system 94 to be used while the rotor 16 is suspended, during a lift.

Figure 5B:
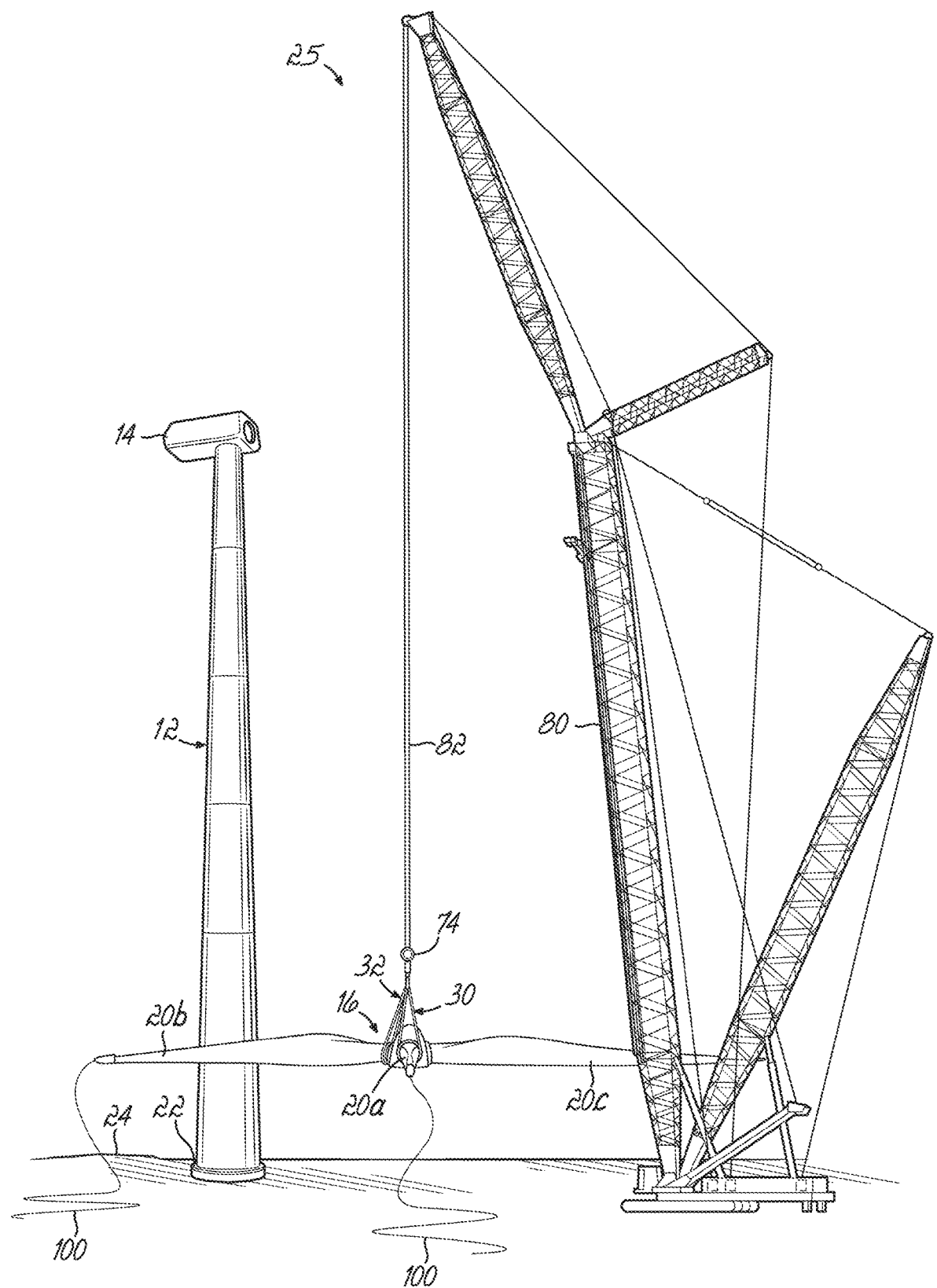

Referring now to FIGS. 5A-5D, a method of performing a full rotor lift is illustrated using the system 25. As shown in FIG. 5A, the assembled rotor 16 may initially be positioned flat on a surface, such as the ground 24, in the vicinity of a wind turbine tower 12 and nacelle 14. First and second slings 30, 32 suspended from a lower sheave 74 of a crane 80 may be wrapped around the first and second blades 20*a*, 20*b* of the rotor 16 as previously described. In one embodiment, taglines 100 may be attached to one or more of the blades 20*a*, 20*b*, 20*c*, and may be gripped by personnel at ground level to prevent the rotor 16 from rotating about the longitudinal axis defined by the hub 17 during lifting of the rotor 16 or to otherwise stabilize the rotor 16, as is known. In any event, with the center of gravity CG encompassed within the lifting envelope E defined by the first and second slings 30, 32, the crane 80 may retract the hoist rope 82 to lift the rotor 16 above ground level while maintaining the rotor 16 in a substantially horizontal orientation, as shown in FIG. 5B. Thus, the third blade 20*c* may be indirectly supported above ground level by the first and second slings 30, 32 and may not require a dedicated support system. For example, there may be no need for a secondary crane to support the third blade 20*c* in order to prevent the third blade 20*c* from impacting the ground 24. Rather, the full rotor lift may be safely performed using a single crane 80 as shown, with the rotor 16 fully supported by the crane 80 via the first and second slings 30, 32.

Figure 5C:
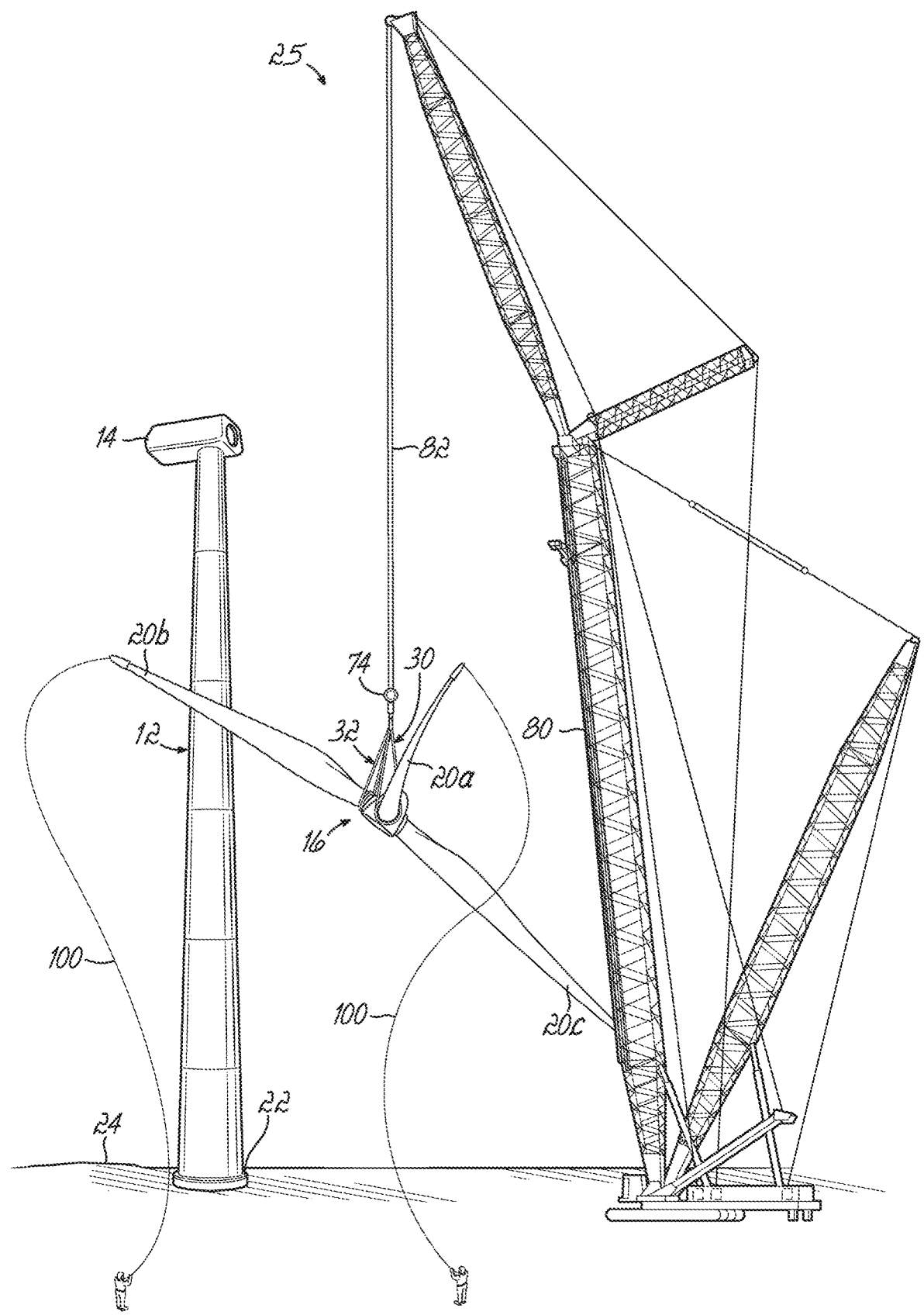
Figure 5D:
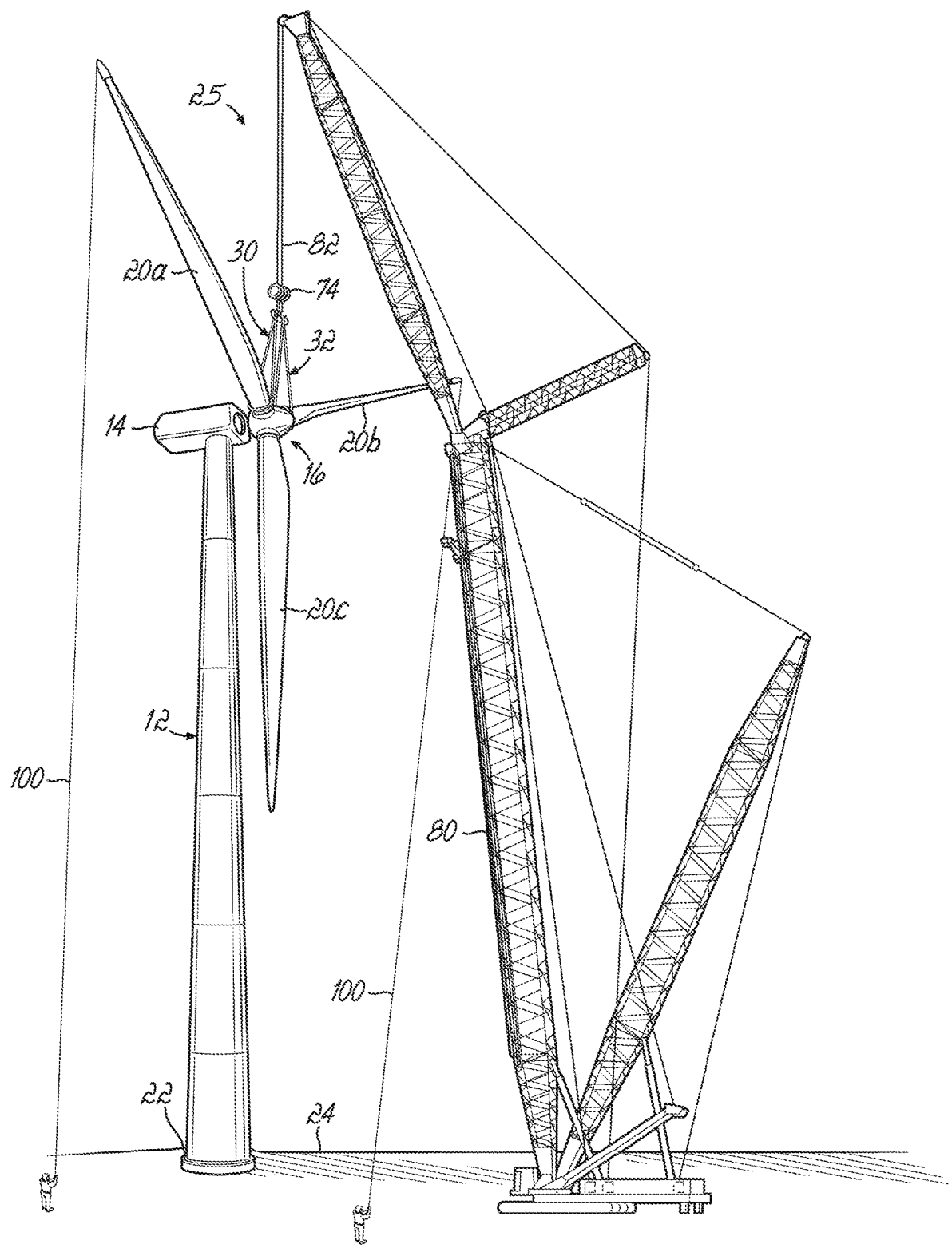

As shown in FIG. 5C, once the rotor 16 has been lifted by the crane 80 to a safe height above ground level, the rotor 16 may be tilted or reoriented toward a vertical orientation as previously described. For example, the rotor 16 may be reoriented via manipulation of the slings 30, 32 by sling actuators 90, 92 or via pitching of the first and second blades 20*a*, 20*b*. A safe height may be a height at which lowering of the third blade 20*c* as a result of reorienting of the rotor 16 toward the vertical orientation may not cause the third blade 20*c* to impact the ground 24 or other obstacles. Thus, the rotor 16 may be reoriented without the need to coordinate the action of the crane 80 with any secondary crane. It will be appreciated that reorientation of the rotor 16 may occur gradually as the rotor 16 is lifted, at multiple heights. For example, the crane 80 may continuously retract the hoist rope 82 while the sling actuators 90, 92 (or pitching systems 94) effect the reorientation of the rotor 16. Alternatively, the rotor 16 may be lifted in the horizontal orientation to a sufficient height whereat lifting of the rotor 16 may be halted while the rotor 16 is reoriented to the vertical orientation. In any event, once the rotor 16 has been substantially reoriented to the vertical orientation, the crane 80 may position the rotor hub 17 proximate the nacelle 14, as shown in FIG. 5D. The rotor 16 may then be mounted to the nacelle 14 in a known manner, and the slings 30, 32 (as well as wedges 60 and/or taglines 100, if used) may be removed from the respective blades 20*a*, 20*b* prior to operation of the assembled wind turbine 10 (FIG. 1). A reverse procedure using the system 25 may be performed to lower the rotor 16 from the nacelle 14, such as for maintenance or replacement purposes.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. The various features of the invention may be used alone or in numerous combinations depending on the needs and preferences of the user.

What is claimed is:

1. A method of lifting a rotor of a wind turbine, the rotor having a center of gravity and including a hub and first, second, and third blades projecting outwardly from the hub at locations circumferentially distributed thereabout, the method comprising:
    positioning first and second slings around the first and second blades, respectively, to define first and second lifting zones delineating a lifting envelope, wherein the lifting envelope encompasses the center of gravity;
    lifting the rotor above a surface via the first and second slings wherein the rotor is in one of a substantially horizontal or substantially vertical orientation while being fully supported via the first and second slings; and
    reorienting the rotor toward the other of a substantially horizontal or substantially vertical orientation, with the aid of at least one of the first and second slings while continuing to fully support the rotor by the first and second slings.

2. The method of claim 1, wherein reorienting the rotor includes activating at least one sling actuator.

3. The method of claim 2, wherein activating the at least one sling actuator adjusts a length of at least one of the first and second slings.

4. The method of claim 2, wherein activating the at least one sling actuator applies a friction drive to at least one of the first and second slings.

5. The method of claim 2, wherein the at least one sling actuator includes at least one of a hydraulic actuator, a jack, a winch, or a friction drive.

6. The method of claim 1, wherein reorienting the rotor includes adjusting a pitch of at least one of the first and second blades.

7. The method of claim 6, wherein reorienting the rotor includes activating at least one pitching system of the rotor to adjust the pitch of at least one of the first and second blades.

8. The method of claim 7, wherein activating the at least one pitching system of the rotor causes the first blade to rotate in a clockwise direction while causing the second blade to rotate in a counterclockwise direction.

9. The method of claim 1, further comprising positioning at least one wedge between at least one of the first and second blades and the respective sling to expand the lifting envelope.

10. A full rotor lift system for lifting a rotor of a wind turbine, the rotor having a center of gravity and including a hub and first, second, and third blades projecting outwardly from the hub at locations circumferentially distributed thereabout in equal intervals, the system comprising:
    first and second slings for attaching to the first and second blades, respectively, to define first and second lifting zones delineating a lifting envelope, wherein the lifting envelope includes the center of gravity such that the first and second slings are capable of fully supporting the rotor above a surface in a horizontal orientation; and
    at least one actuator for reorienting the rotor between a horizontal orientation and a vertical orientation with the aid of at least one of the first and second slings.

11. The system of claim 10, wherein the at least one actuator includes at least one sling actuator.

12. The system of claim 11, wherein the at least one sling actuator is operable to adjust a length of at least one of the first and second slings.

13. The system of claim 11, wherein the at least one sling actuator includes at least one of a hydraulic actuator, a jack, a winch, or a friction drive.

14. The system of claim 10, wherein the at least one actuator includes at least one pitching system of the rotor.

15. The system of claim 14, wherein the at least one pitching system is operable to rotate the first blade in a clockwise direction while rotating the second blade in a counterclockwise direction.

16. The system of claim 10, further comprising at least one wedge operable to expand the lifting envelope when positioned between at least one of the first and second blades and the respective sling.

* * * * *